(12) United States Patent
Delling et al.

(10) Patent No.: US 8,364,717 B2
(45) Date of Patent: Jan. 29, 2013

(54) HARDWARE ACCELERATED SHORTEST PATH COMPUTATION

(75) Inventors: Daniel Delling, Mountain View, CA (US); Andrew V. Goldberg, Redwood City, CA (US); Andreas Nowatzyk, San Jose, CA (US); Renato F. Werneck, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 250 days.

(21) Appl. No.: 12/987,176

(22) Filed: Jan. 10, 2011

(65) Prior Publication Data

US 2012/0179674 A1 Jul. 12, 2012

(51) Int. Cl.
*G06F 17/30* (2006.01)

(52) U.S. Cl. ...................................................... 707/798

(58) Field of Classification Search .................. 707/798
See application file for complete search history.

(56) References Cited

U.S. PATENT DOCUMENTS

| | | |
|---|---|---|
| 6,314,093 B1 | 11/2001 | Mann et al. |
| 6,594,824 B1 | 7/2003 | Volkonsky et al. |
| 7,603,229 B2 | 10/2009 | Goldberg et al. |
| 7,774,734 B2 | 8/2010 | Goldberg et al. |
| 2006/0143205 A1 | 6/2006 | Fuchs |
| 2007/0156330 A1 | 7/2007 | Goldberg et al. |
| 2008/0122848 A1 | 5/2008 | Goldberg et al. |
| 2009/0040931 A1 | 2/2009 | Bast et al. |

OTHER PUBLICATIONS

Goldberg et al., PHAST: Hardware-Accelerated Shortest Path Trees, Sep. 2010, Microsoft, pp. 1-20.*

Chevalier, et al., "PT-Scotch: A tool for efficient parallel graph ordering", Retrieved at << http://www.labri.fr/perso/pelegrin/papers/scotch_parallelordering_pmaa.pdf >>, Parallel Computing, vol. 34, No. 6-8, Jul. 2008, pp. 2.

Yanagisawa, Hiroki., "A Multi-Source Label-Correcting Algorithm for the All-Pairs Shortest Paths Problem", Retrieved at << http://www.trl.ibm.com/people/yanagis/papers/RT0882.pdf >>, Sep. 29, 2009, pp. 1-11.

"Graph Utilities Package", Retrieved at << http://reference.wolfram.com/mathematica/GraphUtilities/tutorial/GraphUtilities.html >>, Retrieved Date: Oct. 20, 2010, pp. 47.

Abraham, et al., "Highway Dimension, Shortest Paths, and Provably Efficient Algorithms", Retrieved at << http://research.microsoft.com/pubs/115272/soda10.pdf >>, Proceedings of the Twenty-First Annual ACM-SIAM Symposium on Discrete Algorithms, SODA, Jan. 17-19, 2010, pp. 12.

Anthonisse, Jac M., "The Rush in a Directed Graph", Retrieved at << http://oai.cwi.nl/oai/asset/9791/9791A.pdf >>, 1971, pp. 12.

Bauer, et al., "SHARC: Fast and Robust Unidirectional Routing", Retrieved at << http://i11www.iti.uni-karlsruhe.de/extra/publications/bd-sharc-09.pdf >>, Journal of Experimental Algorithmics (JEA), vol. 14, Dec. 2009, pp. 1-27.

(Continued)

*Primary Examiner* — Jorge A Casanova
(74) *Attorney, Agent, or Firm* — Microsoft Corporation (57) ABSTRACT

The non-negative single-source shortest path (NSSP) problem is solved on a graph by using a preprocessing phase and then, in a query phase, computing the distances from a given source in the graph with a linear sweep over all the vertices. Contraction hierarchies may be used in the preprocessing phase and in the query phase. Optimizations may include reordering the vertices in advance to exploit locality, performing multiple NSSP computations simultaneously, marking vertices during initialization, and using parallelism. Techniques may be performed on a graphics processing unit (GPU). This makes applications based on all-pairs shortest-paths practical for continental-sized road networks. The applications include, for example, computing graph diameter, exact arc flags, and centrality measures such as exact reaches or betweenness.

20 Claims, 8 Drawing Sheets

OTHER PUBLICATIONS

Bauer, et al., "Combining Hierarchical and Goal-directed Speed-up Techniques for Dijkstra's Algorithm", Retrieved at << http://i11www.iti.uni-karlsruhe.de/extra/publications/bdsssw-chgds-09.pdf >>, Journal of Experimental Algorithmics (JEA), vol. 15, Mar. 2010, pp. 1-26.

Brandes, Ulrik., "A Faster Algorithm for Betweenness Centrality", Retrieved at << http://citeseerx.ist.psu.edu/viewdoc/download?doi=10.1.1.11.2024&rep=rep1&type=pdf >>, Journal of Mathematical Sociology, vol. 25, 2001, pp. 1-15.

Delling, et al., "Engineering Route Planning Algorithms", Retrieved at << http://citeseerx.ist.psu.edu/viewdoc/ download?doi=10.1.1.164.8916&rep=rep1&type=pdf >>, Algorithmics of Large and Complex Networks Lecture Notes in Computer Science, 2009, pp. 117-139.

Denardo, et al., "Shortest-Route Methods: 1. Reaching, Pruning, and Buckets", Retrieved at << http://www.iro.umontreal.ca/~gendron/IFT6542/PresentationArticles/DenardoFox79.pdf >>, 1977, pp. 27.

Dijkstra, E. W., "A Note on Two Problems in Connexion with Graphs", Retrieved at << http://www-m3.ma.tum.de/foswiki/pub/MN0506/WebHome/dijkstra.pdf >>, Numerische Mathematik, vol. 1, No. 1, Dec. 1, 1959, pp. 3.

Fredman, et al., "Fibonacci Heaps and their Uses in Improved Network Optimization Algorithms", Retrieved at << http://www.csee.wvu.edu/~xinl/library/papers/comp/Tarjan_acm1987.pdf >>, Journal of the ACM (JACM), vol. 34, No. 3, Jul. 1987, pp. 596-615.

Freeman, Linton C., "A Set of Measures of Centrality Based Upon Betweeness", Retrieved at << http://moreno.ss.uci.edu/23.pdf. >>, Sociometry, vol. 40, No. 1, 1977, pp. 35-41.

Geisberger, et al., "Contraction Hierarchies: Faster and Simpler Hierarchical Routing in Road Networks", Retrieved at << http://i11www.iti.uni-karlsruhe.de/extra/publications/gssd-chfsh-08.pdf >>, International Workshop on Experimental Algorithms, 2008, pp. 319-333.

Goldberg, Andrew V., "A Practical Shortest Path Algorithm with Linear Expected Time", Retrieved at << http://citeseerx.ist.psu.edu/viewdoc/download?doi=10.1.1.58.36&rep=rep1&type=pdf >>, Nov. 2001, pp. 22.

Goldberg, et al., "Reach for A*: Shortest Path Algorithms with Preprocessing", Retrieved at << http://www.avglab.com/andrew/pub/ch9Book.pdf >>, In the Shortest Path Problem: Ninth DIMACS Implementation Challenge, 2009, pp. 1-47.

Goldberg, et al., "Computing Point-to-Point Shortest Paths from External Memory", Retrieved at << http://www.avglab.com/andrew/pub/alenex05.pdf >>, Proceedings of the Seventh Workshop on Algorithm Engineering and Experiments, ALENEX, 2005, pp. 15.

Gutman, Ron., "Reach-based Routing: A New Approach to Shortest Path Algorithms Optimized for Road Networks", Retrieved at << http://www.siam.org/meetings/alenex04/abstacts/rgutman1.pdf >>, Jan. 6, 2004, pp. 12.

Hilger, et al., "Fast Point-to-Point Shortest Path Computations with Arc-Flags", Retrieved at << http://citeseerx.ist.psu.edu/viewdoc/download?doi=10.1.1.39.3415&rep=rep1&type=pdf >>, DIMACS. Series in Discrete Mathematics and Theoretical Computer Science, 2009, pp. 1-26.

Johnson, Donald B., "Efficient Algorithms for Shortest Paths in Sparse Networks", Retrieved at << http://bohr.wlu.ca/hfan/cp412/07/notes/p1-johnson.pdf >>, Journal of the ACM (JACM), vol. 24, No. 1., Jan. 1977, pp. 1-13.

Kohler, et al., "A Fast and Highly Quality Multilevel Scheme for Partitioning Irregular Graphs", Retrieved at << http://citeseerx.ist.psu.edu/viewdoc/download?doi=10.1.1.39.3415&rep=rep1&type=pdf>>, 4th International Workshop on Efficient and Experimental Algorithms, 2005, pp. 33.

Köhler, et al., "Acceleration of Shortest Path and Constrained Shortest Path Computation", Retrieved at << ftp://ftp.math.tu-berlin.de/pub/Preprints/combi/Report-042-2004.pdf >>, 2005, pp. 1-17.

Lauther, Ulrich., "An Extremely Fast, Exact Algorithm for Finding Shortest Paths in Static Networks with Geographical Background", Retrieved at << http://gi-days.de/archive/2004/downloads/gitage2004/vortraege/lauther.pdf >>, pp. 219-230.

Madduri, et al., "Parallel Shortest Path Algorithms for Solving Large-Scale Instances", Retrieved at << http://www.dis.uniroma1.it/~challenge9/papers/madduri.pdf >>, Nov. 8, 2006, pp. 1-40.

Meyer, et al., "-Stepping : A Parallel Single Source Shortest Path Algorithm", Retrieved at << http://citeseerx.ist.psu.edu/viewdoc/download?doi=10.1.1.46.2200&rep=rep1&type=pdf >>, In ESA Proceedings of the 6th Annual European Symposium on Algorithms, 1998, pp. 12.

Owens, et al., "A Survey of General-purpose Computation on Graphics Hardware", Retrieved at << http://www.google.co.uk/url?sa=t&source=web&cd=1&ved=0CBUQFjAA&url=http%3A%2F%2Fwww.idav.ucdavis.edu%2Ffunc%2Freturn_pdf%3Fpub_id%3D844&rct=j&q=A%20Survey%20of%20General-purpose%20Computation%20on%20Graphics%20Hardware&ei=86O-TOv-Mlm6jAe7te20Ag&usg=AFQjCNGJmbevqpP6sJUjvVZ3kQZUU3K_BA >>, Computer Graphics Forum, vol. 26, No. 1, Mar. 2007, pp. 31.

"PTV AG—Planung Transport Verkehr", Retrieved at << http://www.ptv.de >>, Retrieved Date: Oct. 20, 2010, pp. 2.

* cited by examiner

HARDWARE ACCELERATED SHORTEST PATH COMPUTATION

BACKGROUND

Existing computer programs known as road-mapping programs provide digital maps, often complete with detailed road networks down to the city-street level. Typically, a user can input a location and the road-mapping program will display an on-screen map of the selected location. Some road-mapping products include the ability to calculate a best route between two locations. The user can input two locations, and the road-mapping program will compute the driving directions from the source location to the destination location.

The computation of driving directions can be modeled as finding the shortest path on a graph which may represent a road map or network. Given a source (the origin) and a target (the destination), the goal is to find the shortest (least costly) path from the source to the target. Existing road-mapping programs employ variants of a method attributed to Dijkstra to compute shortest paths. Dijkstra's algorithm, which is well known, is the standard solution to this problem. It processes vertices one by one, in order of increasing distance from the source, until the destination is reached.

Thus, motivated by web-based map services and autonomous navigation systems, the problem of finding shortest paths in road maps and networks has received a great deal of attention recently. However, research has focused on accelerating point-to-point queries, in which both a source and a target are known, as opposed to the single-source shortest path problem which is another well known optimization problem.

For the single-source shortest path problem, given a graph G containing a set of vertices V (the number of vertices is denoted by n) in a collection of data A (i.e., G=(V, A)), a length l(a) assigned to each arc a $\in$ A, and a source vertex, the goal is to find shortest paths from the source vertex to all other vertices in the graph. The non-negative single-source shortest path (NSSP) problem, in which $l(a) \geq 0$, is a special case that comes up in many applications. It can be solved using Dijkstra's algorithm. However, Dijkstra's algorithm is not sufficiently fast for some applications, for example those that require many shortest path trees to be computed, like all pairs of shortest paths on the road network of Europe or North America.

SUMMARY

The non-negative single-source shortest path problem is solved on a graph by using a preprocessing phase and then, in a query phase, computing the distances from a given source in the graph with a linear sweep over all the vertices. Contraction hierarchies may be used in the preprocessing phase and in the query phase.

In implementations, optimizations may include reordering the vertices in advance to exploit locality, performing multiple NSSP computations simultaneously, and using parallelism at instruction and multi-core level.

In an implementation, techniques may be performed on a graphics processing unit (GPU). This makes applications based on all-pairs shortest-paths practical for continental-sized road networks. The applications include, for example, computing graph diameter, exact arc flags, and centrality measures such as exact reaches or betweenness.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
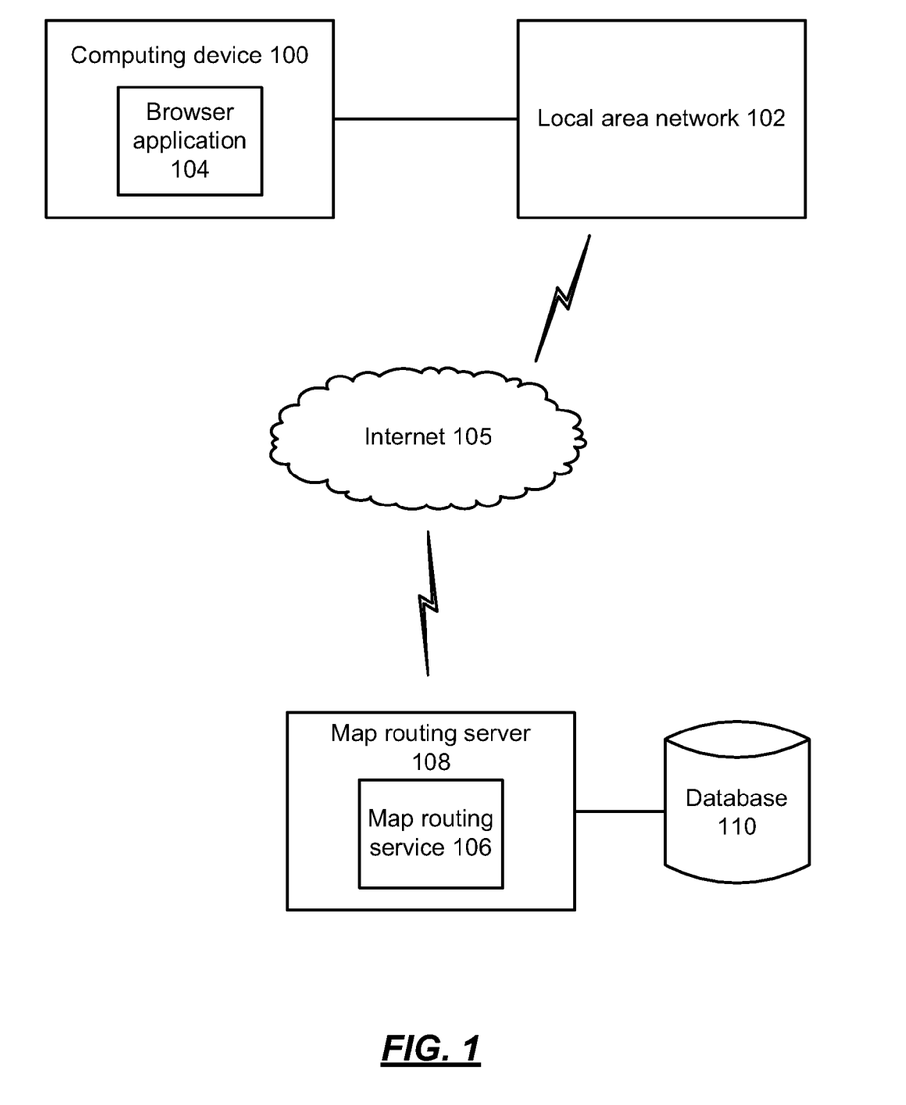
FIG. 1 shows an example of a computing environment in which aspects and embodiments may be potentially exploited.

FIG. 1 shows an example of a computing environment in which aspects and embodiments may be potentially exploited. A computing device 100 includes a network interface card (not specifically shown) facilitating communications over a communications medium. Example computing devices include personal computers (PCs), mobile communication devices, etc. In some implementations, the computing device 100 may include a desktop personal computer, workstation, laptop, PDA (personal digital assistant), cell phone, or any WAP-enabled device or any other computing device capable of interfacing directly or indirectly with a network. An example computing device 100 is described with respect to the computing device 800 of FIG. 8, for example.

The computing device 100 may communicate with a local area network 102 via a physical connection. Alternatively, the computing device 100 may communicate with the local area network 102 via a wireless wide area network or wireless local area network media, or via other communications media. Although shown as a local area network 102, the network may be a variety of network types including the public switched telephone network (PSTN), a cellular telephone network (e.g., 3G, 4G, CDMA, etc), and a packet switched network (e.g., the Internet). Any type of network and/or network interface may be used for the network.

The user of the computing device 100, as a result of the supported network medium, is able to access network resources, typically through the use of a browser application 104 running on the computing device 100. The browser application 104 facilitates communication with a remote network over, for example, the Internet 105. One exemplary network resource is a map routing service 106, running on a map routing server 108. The map routing server 108 hosts a database 110 of physical locations and street addresses, along with routing information such as adjacencies, distances, speed limits, and other relationships between the stored locations.

A user of the computing device 100 typically enters a query request through the browser application 104. The query request may include a start location (and/or other location, like a destination location, and/or other information like a request for a particular type of establishment like restaurants or pharmacies, for example). The map routing server 108 receives the request and produces output data (e.g., various routes, attractions, data items, locations, identifiers of nearby establishments like restaurants or pharmacies, etc.) among the locations stored in the database 110 with respect to the start location. The map routing server 108 then sends the output data back to the requesting computing device 100. Alternatively, the map routing service 106 is hosted on the computing device 100, and the computing device 100 need not communicate with a local area network 102.

To visualize and implement routing methods, it is helpful to represent locations and connecting segments as an abstract graph with vertices and directed edges. Vertices correspond to locations, and edges correspond to road segments between locations. The edges may be weighted according to the travel distance, transit time, and/or other criteria about the corresponding road segment. The general terms "length" and "distance" are used in context to encompass the metric by which an edge's weight or cost is measured. The length or distance of a path is the sum of the weights of the edges contained in the path. For manipulation by computing devices, graphs may be stored in a contiguous block of computer memory as a collection of records, each record representing a single graph node or edge along with associated data.

As described further herein, the map routing service 106 can solve the non-negative single-source shortest path problem (also known as the single-source shortest path problem with non-negative arc lengths or NSSP). Given a graph G, representing a network of nodes or a road map in some implementations, with non-negative arc lengths and a source s, the goal is to find the distance from s to every vertex in G. This is a classical problem with many applications. In particular, applications on a road network use many NSSP computations, such as finding network diameter, reach preprocessing, arc flag preprocessing, and betweenness centrality.

The map routing service 106 can perform the NSSP solution technique of Dijkstra. For every vertex v, the technique maintains the length d(v) of the shortest path from the source s to vertex v found so far, as well as the predecessor (parent) p(v) of vertex v on the path. Initially, the length d(s) is set to zero, and the lengths d(v) are set to ∞ for all other vertices, and the predecessor p(v) is set to null for all vertices v. The technique maintains a priority queue of unscanned vertices with finite length d values. At each step, it removes from the queue a vertex v with minimum d(v) value and scans it. For every arc (v,w)∈A with d(v)+l(v,w)<d(w), the length d(w) is set equal to d(v)+l(v,w) and the predecessor p(w) is set equal to v (note that the length of (v,w) is denoted by l(v,w)). The technique terminates when the queue becomes empty. However, the technique of Dijkstra can be prohibitive in terms of computational time and resources.

Figure 2:
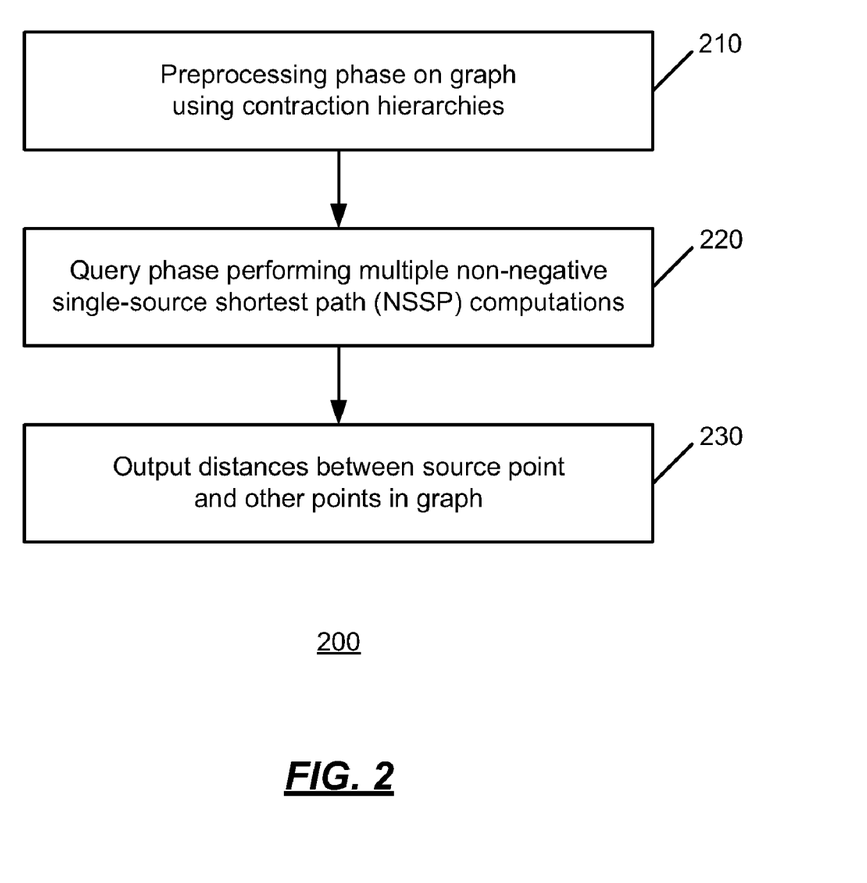
FIG. 2 is an operational flow of an implementation of a method which may be used in solving a NSSP problem.

Instead, in an implementation, a technique for solving the NSSP comprises two phases: a preprocessing phase that uses a contraction hierarchies (CH) technique along with dividing vertices into levels, assigning new identifiers to vertices and rearranging the vertices, and a query phase that performs multiple NSSP computations. For example, FIG. 2 is an operational flow of an implementation of a method which may be used in solving a NSSP problem. At 210, a preprocessing phase is performed on the graph using CH, as described further herein. Upon receiving a query, at 220, a query phase is performed that performs the NSSP computations, described further herein, with respect to a source location. The NSSP computations result in distances between the source vertex and other locations (vertices) in the graph. These distances are outputted, for example, to the computing device 100 (e.g., for display, further processing, and/or storage), at 230.

The CH technique is a well known technique that has been used to speed up point-to-point shortest path computations on road networks. It has two phases. A first phase takes only the graph as input, and produces auxiliary data. A second phase takes the source s and target t as inputs, and uses the auxiliary data to compute the shortest path from the source s to the target t.

More particularly, the first phase of CH sorts the vertices by importance (heuristically), then shortcuts them in this order. To shortcut a vertex, the vertex is temporarily removed from the graph and as few new edges as needed are added to preserve distances between all remaining (more important) vertices. The insertion of shortcuts (edges representing the shortest paths in the original graph) may significantly improve the efficiency of queries.

The shortcut operation deletes a vertex v from the graph (temporarily) and adds arcs between its neighbors to maintain the shortest path information. More precisely, for any pair of vertices {u,w} that are neighbors of vertex v such that (u,v)• (v,w) is the only shortest path in between vertex u and vertex w in the current graph, a shortcut (u,w) is added with l(u,w)= l(u,v)+l(v,w). The output of this routine is the set A+ of shortcut arcs and the position of each vertex v in the order (denoted by rank(v)). The second phase of CH runs a bidirectional version of Dijkstra's algorithm on the graph G+ (where G+=(V, A ∪ A+)), with both searches only looking at upward arcs that lead to neighbors with higher rank. As used herein, G↑ refers to the graph containing only upward arcs and G↓ refers to the graph containing only downward arcs, where G↑=(V, A↑) and G↓=(V, A↓).

Figure 3:
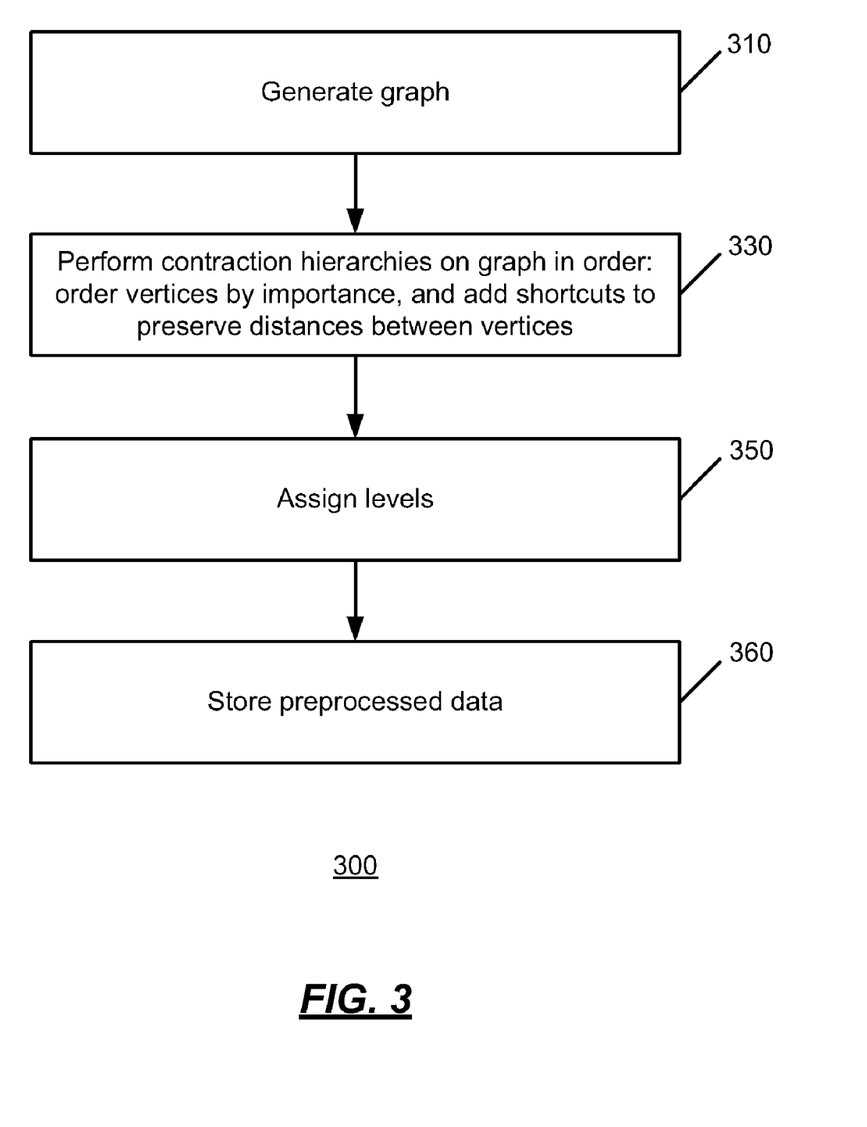
FIG. 3 is an operational flow of an implementation of a preprocessing method which may be used in solving a NSSP problem.

In an implementation, in solving the NSSP, at 210, the preprocessing phase uses the first phase of CH to obtain a set of shortcuts A+ and a vertex ordering. FIG. 3 is an operational flow of an implementation of a preprocessing method 300 which may be used in solving a NSSP problem. At 310, a graph G is generated based on the road network data, map data, or other location data, e.g., stored in the database 110. The graph may be generated by the map routing service 106 or any computing device, such as a computing device 800 described with respect to FIG. 8, for example. Each node of the graph corresponds to a vertex (a point on the graph) and weights (e.g., distances) may be assigned between various vertices.

A contraction hierarchies technique is performed on the vertices of the graph in the order, at 330. Along with the contraction hierarchies, the vertices of the graph are ordered. The vertices may be ordered using any ordering technique. In an implementation, the vertices may be ordered numerically, with each vertex being assigned a different number based on its location or other measure of "importance" for example. Shortcuts (additional edges) may be added between various vertices in order to preserve distances between those vertices.

At 350, levels may be assigned to each of the vertices. In an implementation, when assigning levels to vertices, the following constraint is obeyed: for any edge (v,w), if rank(w)> rank(v) then level(w)>level(v). Any number of levels may be used. There is no limit as to the number of vertices that may be assigned to a particular level. In an implementation, levels may be assigned using techniques described with respect to FIG. 5. At 360, the data corresponding to the shortcuts, the levels, the distances between the vertices, and the ordering is stored (e.g., in the database 110) as the preprocessed data. The preprocessed data may then be accessed and used at query time.

Figure 4:
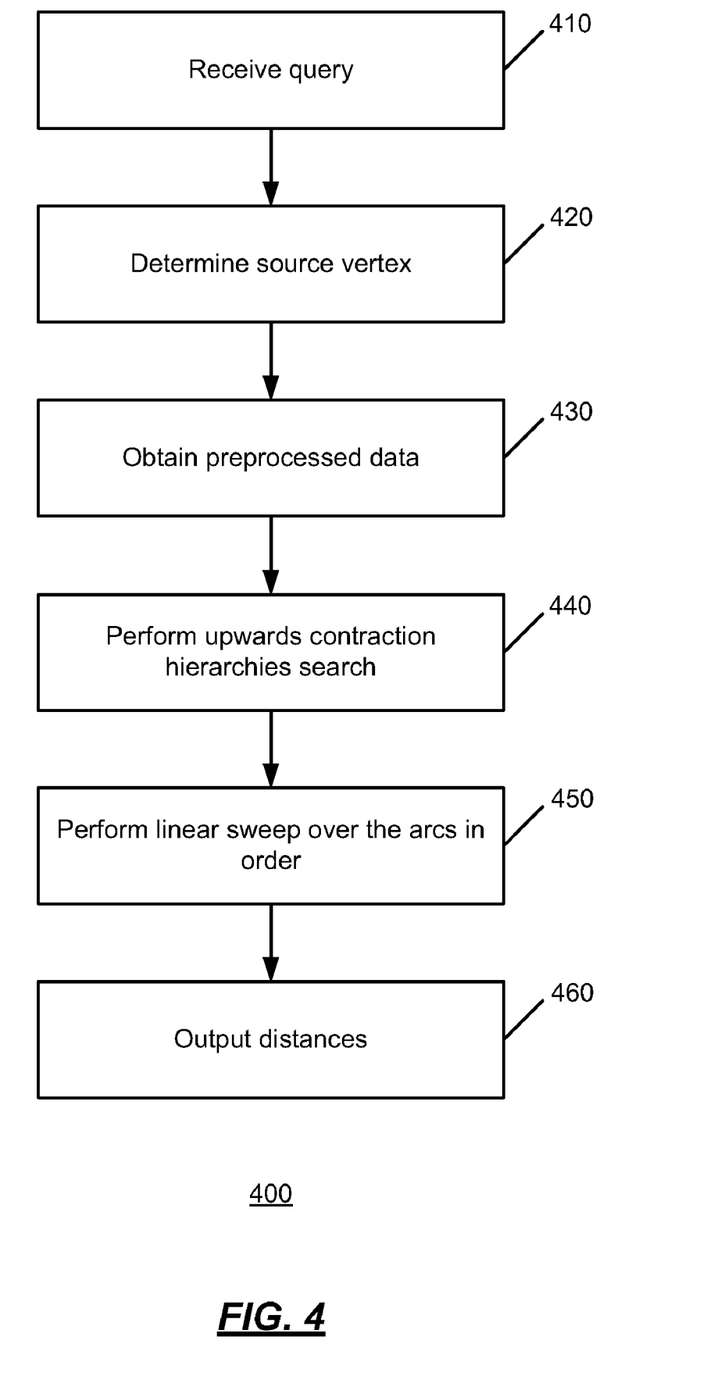
FIG. 4 is an operational flow of an implementation of a method which may be used at query time in solving a NSSP problem.

FIG. 4 is an operational flow of an implementation of a method 400 which may be used at query time in solving a NSSP problem. At 410, a query is received, e.g. at the map routing service 106 from a user via the computing device 100. The query may be a request for certain locations near (e.g., within a distance from) a source location. For example, the user may request a list of all restaurants near the current location of the user.

At 420, upon receiving the query, a source vertex is determined. The source vertex may be based on the location of the user, the computing device of the user, or on a location provided or selected by the user, for example. The preprocessed data (e.g., from the method 300) is obtained from storage at 430.

At 440, an upwards CH search is performed. In an implementation, for a one-to-all search from the source vertex, a CH forward search from the source vertex is run. At 450, a linear sweep is performed over the arcs (resulting from the CH search) in reverse level order. At 460, the distances that are generated by the linear sweep are output. These distances may be used to respond to the query (e.g., as corresponding to establishments, such as restaurants, that are near the source location).

In an implementation, in solving the NSSP, the query phase initially sets the distance $d(v)=\infty$ for all vertices v that do not equal the source vertex s, and $d(s)$ is set equal to 0. The actual search may be executed in two subphases. First, a forward CH search is performed (at 440): Dijkstra's algorithm is run from the source vertex s in $G\uparrow$ (in increasing rank order), stopping when the queue of vertices becomes empty. This sets the distance labels $d(v)$ of all vertices visited by the search. The second subphase (at 450) scans all vertices in $G\downarrow$ in any reverse topological order (e.g., reverse level order or descending rank order, depending on the implementation). To scan the vertices v, each incoming arc $(u, v) \in A\downarrow$ is examined; if $d(v) > d(u)+l(u, v)$, then $d(v)$ is set equal to $d(u)+l(u, v)$ (otherwise $d(v)$ remains equal to $d(v)$). This technique is used to set the distances of each of the reached vertices.

In some implementations, optimizations may be performed, including those directed to reordering vertices, computing multiple trees, and initialization.

Reordering of the vertices leads to improved memory locality during the query subphase that scans the vertices of $G\downarrow$ (at 450). Vertices have sequential identifiers (IDs) from 0 to n−1. $G\uparrow$ may be represented using a standard cache-efficient representation based on a pair of arrays. One of the arrays, "arclist", comprises a list of arcs sorted by tail ID, i.e., arc (u, •) appears before (w, •) if u<w. This ensures that the outgoing arcs from vertex v are stored consecutively in memory. Each arc (v,w) is represented as a two-field structure containing the ID of the head vertex (w) and the length of the arc. The other array in the pair, "first", is indexed by vertex IDs; first[v] denotes the position in arclist of the first outgoing arc from vertex v. To traverse the adjacency list, arclist is followed until first[v+1] is met.

The representation of $G\downarrow$ is identical, except that arclist represents incoming arcs instead of outgoing arcs. This means that arclist is sorted by head ID, and the structure representing an arc contains the ID of its tail (not head). Distance labels are maintained as a separate array, indexed by vertex IDs.

Figure 5:
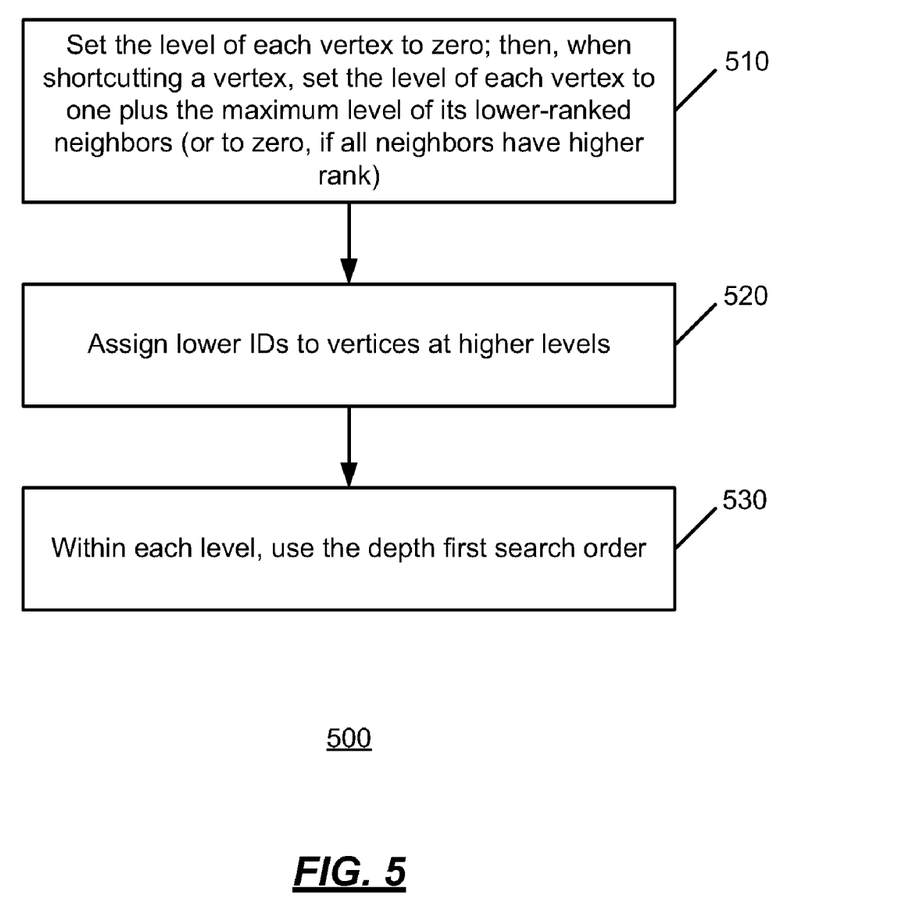
FIG. 5 is an operational flow of an implementation of a method for reordering vertices.

FIG. 5 is an operational flow of an implementation of a method 500 for reordering vertices. The method 500 may be performed during preprocessing (at 210), such as while shortcutting the vertices (at 330), for example.

At 510, the level of each vertex is initially set to zero. Then, when shortcutting a vertex u, set $L(v)=\max\{L(v),L(u)+1\}$ for each current neighbor v of u, i.e., for each v such that (u, v)∈A↑ or (v, u)∈A↓. Thus, if (v, w)∈A↓, then L(v)>L(w). This means that the query phase can process vertices in descending order of level: vertices on level i are only visited after all vertices on levels greater than i have been processed. This order respects the topological order of $G\downarrow$. In this manner, the level of each vertex is set to one plus the maximum level of its lower-ranked neighbors (or to zero, if all neighbors have higher rank).

Within the same level, the vertices can be scanned in any order. In particular, by processing vertices within a level in increasing order of IDs, locality is maintained and the running time of the technique to solve the NSSP is decreased.

To increase locality even further, new IDs can be assigned to vertices. At 520, lower IDs are assigned to vertices at higher levels, and at 530, within each level, the depth first search (DFS) order is used. Now the second phase will be correct with a linear sweep in increasing order of IDs. It can access vertices, arcs, and head distance labels sequentially, with perfect locality. The only non-sequential access is to the distance labels of the arc tails (recall that scanning v requires looking at the distance labels of its neighbors). Keeping the DFS relative order within levels helps to reduce the number of the associated cache misses.

Reordering ensures that the only possible non-sequential accesses during the linear sweep phase happen when reading distance labels of arc tails. More precisely, when processing vertex v, look at all incoming arcs (u, v). The arcs themselves are arranged sequentially in memory, but the IDs of their tail vertices are not sequential.

Figure 6:
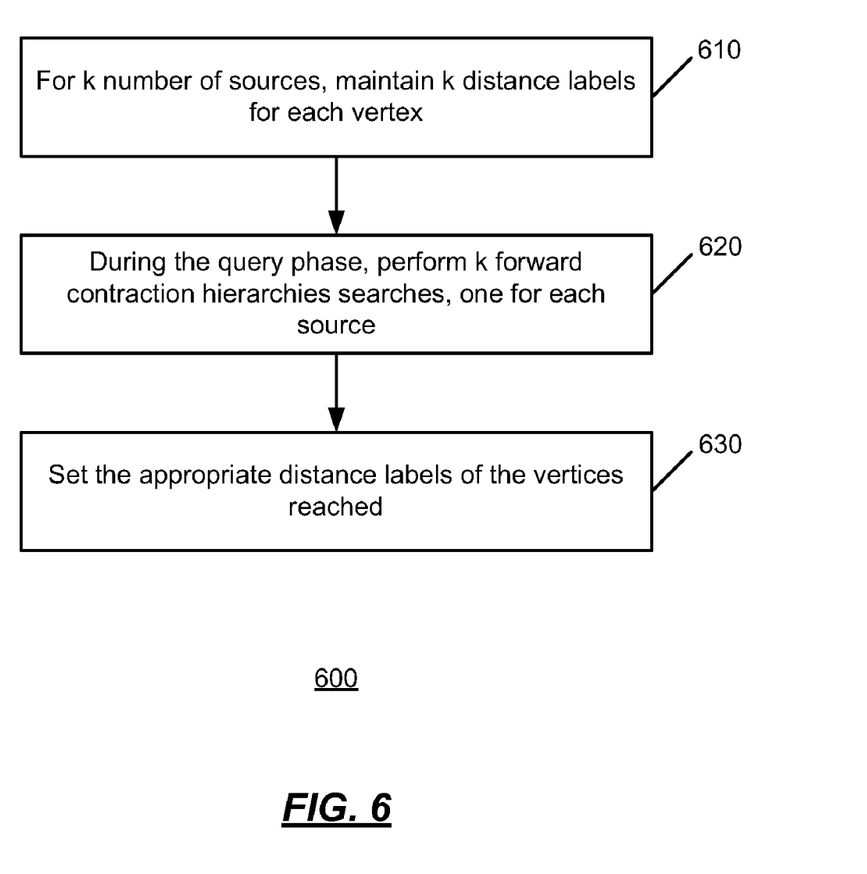
FIG. 6 is an operational flow of an implementation of a method for running multiple computations simultaneously.

Locality can also be improved by running multiple NSSP computations simultaneously. FIG. 6 is an operational flow of an implementation of a method 600 for running multiple computations simultaneously.

For computing with k sources $(s_0, s_1, \ldots, s_{k-1})$ at once, k distance labels are maintained for each vertex $(d_0, d_1, \ldots, d_{k-1})$, at 610. In an implementation, these are maintained as a single array of length kn, laid out so that the k distances associated with a vertex v are consecutive in memory. At 620, the query phase performs (sequentially) k forward CH searches, one for each source, and at 630, the query phase sets the appropriate distance labels of all vertices reached.

The linear sweep during the query phase processes vertices in the same order regardless of source, so all k sources can be processed during the same pass, as follows. To process each incoming arc (u, v) into a vertex v, first retrieve its length and the ID of u. Then, for each tree i (for $0 \leq i \leq k$), compute $d_i(u)+l(u, v)$ and update $d_i(v)$ if the new value is an improvement. For a fixed v, all $d_i(v)$ values are consecutive in memory and are processed sequentially, which leads to better locality and fewer cache misses.

Figure 7:
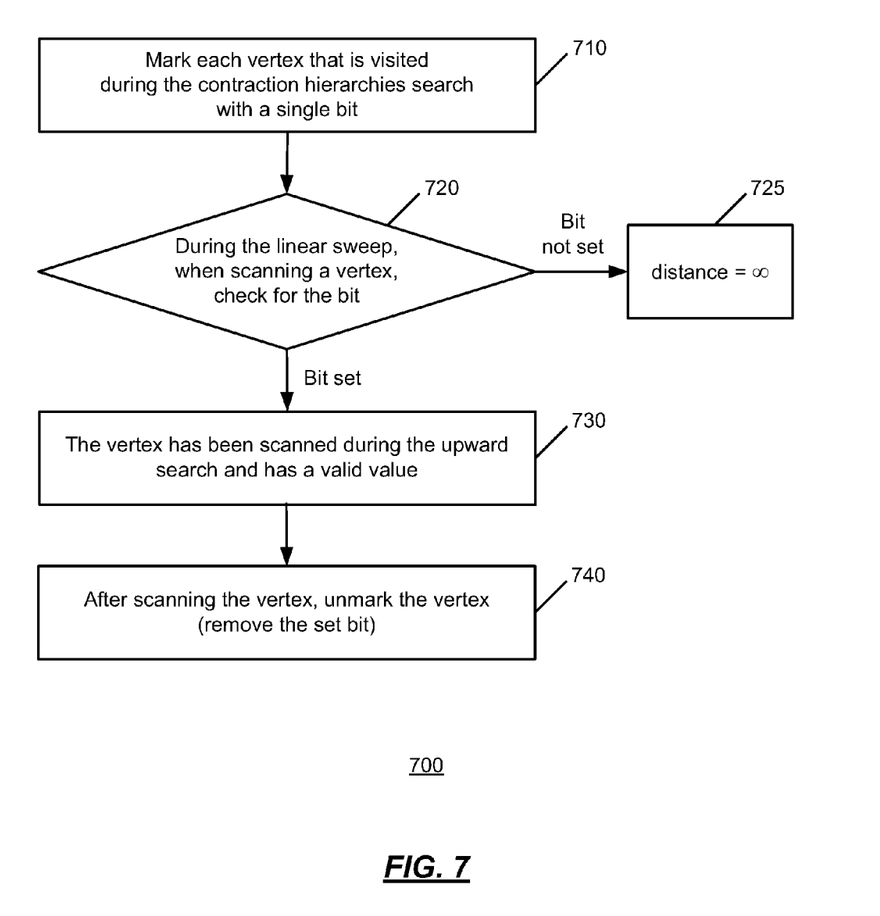
FIG. 7 is an operational flow of an implementation of a method for optimizing an initialization.

Another optimization is initialization. FIG. 7 is an operational flow of an implementation of a method 700 for optimizing an initialization. In an implementation, the distance labels are set to ∞ during initialization. This uses a linear sweep over all distance labels, which may lead to a time penalty. To avoid this, at 710, vertices visited during the CH search are marked, e.g., with a single bit. At 720, during the linear sweep, when scanning a vertex v, this bit is checked for. If the bit is not set, then the distance $d(v)$ is set to ∞, at 725; otherwise, if the bit is set, it is known at 730 that the vertex v has been scanned during the upward search and has a valid value. After scanning the vertex v, the vertex is unmarked at 740 for the next shortest path tree computation.

Parallelism may be used in an implementation on a multi-core CPU. For computations that use shortest path trees from several sources, different sources may be assigned to each core of the CPU. Since the computations of the trees are independent from one another, speedup is significant. A single tree computation may also be parallelized. For example, vertices of the same level may be processed in parallel if multiple cores are available. In an implementation, vertices in a level may be partitioned into approximately equal-sized blocks and each block is assigned to a thread (i.e., a core). When all the threads terminate, the next level is processed. Blocks and their assignment to threads can be computed during preprocessing. This type of parallelization may be used in a GPU implementation.

In an implementation involving a GPU, the linear sweep of the query phase is performed by the GPU, and the CPU remains responsible for computing the upward CH trees. During initialization, G↑ and the array of distance labels are copied to the GPU. To compute a tree from a source vertex s, the CH search is run on the CPU and the search space is copied to the GPU. As in the single-tree parallel implementation, each level may be processed in parallel. The CPU starts, for each level i, a kernel on the GPU, which is a collection of threads that all execute the same code and that are scheduled by the GPU hardware. Note that each thread is responsible for exactly one vertex. With this approach, the overall access to the GPU memory is efficient in the sense that memory bandwidth utilization is maximized. If the GPU has enough memory to hold additional distance labels, multiple trees may be computed in parallel.

When computing k trees at once, the CPU first computes the k CH upward trees and copies all k search spaces to the GPU. Again, the CPU activates a GPU kernel for each level. Each thread is still responsible for writing exactly one distance label.

The techniques described above may be used in determining network diameter, reach preprocessing, arc flag preprocessing, and betweenness centrality.

The diameter of a graph G is defined by the longest shortest path in G. Its exact value can be computed by building n shortest path trees (where n is the number of vertices in the input graph). This may be performed by making each core of the CPU keep track of the maximum label it encounters. The maximum of these values is the diameter. In an implementation with a GPU, an array of size n may be used to keep track of the maximum value assigned to each vertex over all n shortest path computations. One sweep may be performed over all the vertices to collect the maximum.

Arc flags are used to speed up the computation of point-to-point shortest paths. A preprocessing algorithm first computes a partition C of V into cells, then attaches a label to each arc a. A label contains, for each cell c in C, a Boolean flag $F_c(a)$ which is true if there is a shortest path starting with a to at least one vertex in c. During queries, a modified variant of Dijkstra's algorithm only considers arcs for which the flag of the target cell is set to true. This approach can be made bidirectional. The computation of arc flags uses a preprocessing stage in which several shortest-path trees are computed. The techniques described above can be used instead of Dijkstra's algorithm in this computation.

The techniques described above can also be used to compute the exact reach of a vertex v. The reach of v is defined as the maximum, over all shortest s-t paths containing v, of min{dist(s, v), dist(v, t)}. This notion is useful to accelerate the computation of point-to-point shortest paths.

Another centrality measure based on shortest paths is betweenness. Computing exact betweenness relies on n shortest path tree computations, which may be performed using the techniques described above.

Note that these and other applications often use traversing of the resulting shortest path tree in bottom-up fashion. This can be performed in a cache-efficient way by scanning vertices in level order.

Figure 8:
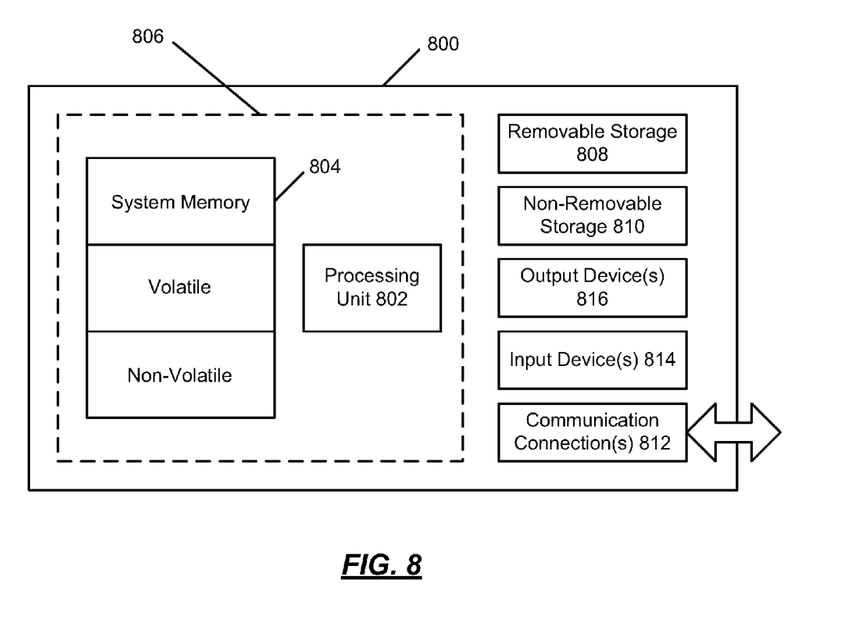
FIG. 8 shows an exemplary computing environment.

FIG. 8 shows an exemplary computing environment in which example implementations and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, PCs, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 8, an exemplary system for implementing aspects described herein includes a computing device, such as computing device 800. In its most basic configuration, computing device 800 typically includes at least one processing unit 802 and memory 804. Depending on the exact configuration and type of computing device, memory 804 may be volatile (such as random access memory (RAM)), non-volatile (such as read-only memory (ROM), flash memory, etc.), or some combination of the two. This most basic configuration is illustrated in FIG. 8 by dashed line 806.

Computing device 800 may have additional features/functionality. For example, computing device 800 may include additional storage (removable and/or non-removable) including, but not limited to, magnetic or optical disks or tape. Such additional storage is illustrated in FIG. 8 by removable storage 808 and non-removable storage 810.

Computing device 800 typically includes a variety of computer readable media. Computer readable media can be any available media that can be accessed by computing device 800 and include both volatile and non-volatile media, and removable and non-removable media.

Computer storage media include volatile and non-volatile, and removable and non-removable media implemented in any method or technology for storage of information such as computer readable instructions, data structures, program modules or other data. Memory 804, removable storage 808, and non-removable storage 810 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media may be part of computing device 800.

Computing device 800 may contain communications connection(s) 812 that allow the device to communicate with other devices. Computing device 800 may also have input device(s) 814 such as a keyboard, mouse, pen, voice input device, touch input device, etc. Output device(s) 816 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for graph preprocessing, comprising:
   receiving as input, at a computing device, a graph comprising a plurality of vertices and arcs;
   performing contraction hierarchies on the graph, by the computing device, to generate shortcuts between at least some of the vertices;
   assigning levels to each of the vertices, by the computing device; and
   storing data corresponding to the vertices, the shortcuts, and the levels, as preprocessed graph data in storage associated with the computing device.

2. The method of claim 1, further comprising ordering the vertices into an order prior to performing the contraction hierarchies on the graph, wherein the contraction hierarchies are performed based on the order.

3. The method of claim 2, further comprising storing data corresponding to the order as a portion of the preprocessed graph data.

4. The method of claim 2, wherein ordering the vertices comprises ordering the vertices based on a measure of importance of the vertices.

5. The method of claim 2, further comprising reordering the vertices after performing the contraction hierarchies on the graph.

6. The method of claim 1, wherein the graph represents a network of nodes.

7. The method of claim 1, wherein the graph represents a road map.

8. The method of claim 1, wherein the method is implemented for a non-negative single-source shortest path application.

9. A method for determining distances on a graph, comprising:
   preprocessing, at a computing device, a graph comprising a plurality of vertices to generate data corresponding to the vertices, a plurality of shortcuts between at least a portion of the vertices, a plurality of levels associated with the vertices, and an order of the vertices to generate preprocessed graph data;
   receiving a query at the computing device;
   determining a source vertex based on the query, by the computing device;
   performing, by the computing device, a plurality of non-negative single-source shortest path computations on the preprocessed data with respect to the source vertex to determine the distances between the source vertex and a plurality of other vertices in the graph; and
   outputting the distances, by the computing device.

10. The method of claim 9, wherein performing the non-negative single-source shortest path computations comprises:
    performing an upwards contraction hierarchies search from the source vertex to generate a plurality of arcs; and
    performing a linear sweep over the arcs.

11. The method of claim 10, wherein performing the upwards contraction hierarchies search comprises setting distance labels of each of the plurality of vertices.

12. The method of claim 10, wherein performing the linear sweep comprises scanning the plurality of vertices in a descending rank order.

13. The method of claim 10, further comprising:
    marking each of the vertices with a single bit responsive to the upwards contraction hierarchies search;
    checking for the single bit during the linear sweep; and
    setting the distance label for each of the vertices based on whether or not the vertex is marked with the single bit.

14. The method of claim 10, wherein the computing device comprises a CPU and a GPU, and the upwards contraction hierarchies search is performed by the CPU and the linear sweep is performed by the GPU.

15. The method of claim 9, wherein the plurality of non-negative single-source shortest path computations are performed simultaneously.

16. A method for determining distances on a graph, comprising:
    receiving as input, at a computing device, preprocessed graph data representing a graph comprising a plurality of vertices, wherein the preprocessed data corresponds to the vertices, a plurality of shortcuts between at least a portion of the vertices, a plurality of levels associated with the vertices, and an order of the vertices, wherein the preprocessed graph data is generated using contraction hierarchies on the graph;
    performing, by the computing device, a plurality of shortest path computations on the preprocessed graph data with respect to a source vertex to determine the distances between the source vertex and a plurality of other vertices in the graph, wherein the plurality of shortest path computations use a contraction hierarchies search; and
    outputting the distances, by the computing device.

17. The method of claim 16, wherein the plurality of shortest path computations comprises a plurality of non-negative single-source shortest path computations.

18. The method of claim 16, further comprising generating the preprocessed graph data comprising:
receiving as input the graph comprising the plurality of vertices;
ordering the vertices into an order;
performing the contraction hierarchies on the graph based on the order to generate shortcuts between at least some of the vertices;
assigning levels to each of the vertices; and
storing data corresponding to the vertices, the shortcuts, the order, and the levels, as the preprocessed graph data in storage associated with the computing device.

19. The method of claim 16, wherein the method is implemented for a non-negative single-source shortest path application.

20. The method of claim 19, wherein the method is implemented for an application that determines graph diameter, determines exact arc flags, determines an exact reach of a vertex, or determines exact betweenness.

* * * * *